Nov. 12, 1968    J. B. CHAS    3,410,642
DEVICE FOR DETERMINING THE POSITION OF A SHIP
Filed Sept. 10, 1965
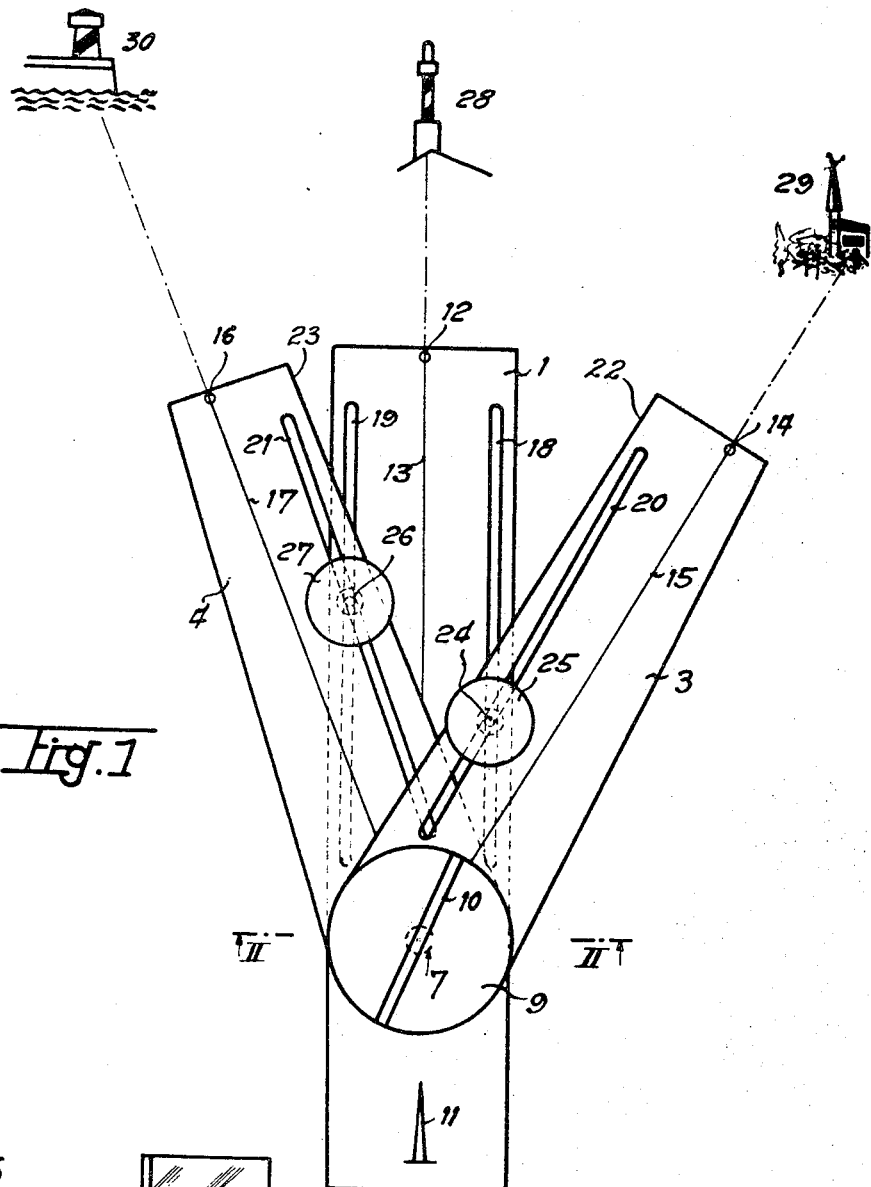
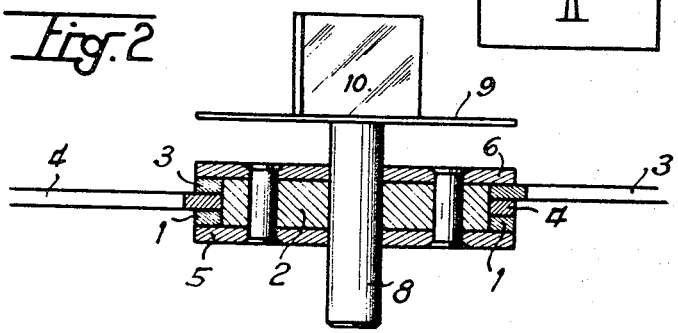
INVENTOR.
JEAN BERNARD CHAS
BY
*Woodhams, Blanchard & Flynn*
ATTORNEYS 3,410,642
DEVICE FOR DETERMINING THE POSITION OF A SHIP
Jean Bernard Chas, 10 Avenue Foch, Le Havre, France
Filed Sept. 10, 1965, Ser. No. 486,480
Claims priority, application France, June 15, 1965, 20,838
2 Claims. (Cl. 356—144)

ABSTRACT OF THE DISCLOSURE

A ship locator including a transparent base rule having a rear sight and a front sighting stud, and two additional transparent rules mounted pivotally on a common bearing on the base rule line of sight, each likewise having at its free end a sighting stud. A detachable mirror is rotatably mounted by a pin frictionally retained coaxially within the pivot bearing. This permits a landmark aligned with either of the additional rules to be superposed on the landmark aligned with the base rule. Clamping screws pass through longitudinal slots in the rules offset from the pivot point.

---

This invention relates to a simple, inexpensive and practically trouble-free device which serves to determine the position of a ship which is within sight of a coast.

The device according to the invention essentially comprises in combination a base rule provided with a rear sight and sighting stud so as to define a line of sight, two rules pivotally attached to each other as well as to the base rule and each fitted with a stud at the free end thereof, means for immovably securing said rule in any relative position with respect to the base rule, and a detachable mirror rotatably mounted at the point of pivotal attachment of said rules to each other.

In accordance with an advantageous form of embodiment of this invention, the three rules are formed of transparent material and the lines of sight as defined by the pivotal axis or the rearsight and the sighting studs are materialized by a line which is cut on each of said rules.

In accordance with another form of embodiment of this invention which can be employed either alone or in combination with the preceding form of embodiment, the base rule is provided with two parallel elongated slots each located in the vicinity of one of the longitudinal edges of said rule and each of the two other rules is also provided with a longitudinal slot which is preferably formed in the vicinity of the longitudinal edges of the opposite-facing rules, a bolt being inserted through one of the slots of the base rule and the corresponding slot of one of the articulated rules, a knurled nut being engageable by screwing on said bolt in order to immovably secure each articulated rule with respect to the base rule and independently of the other articulated rule.

Further characteristic features of the invention will be brought out by the description which now follows below, reference being made to the accompanying drawings which are given solely by way of example without implied limitation, and in which:

FIG. 1 is a plan view of a device in accordance with the invention;

FIG. 2 is a cross-section taken along the line II—II of FIG. 1.

As shown in the drawings, the device which is shown by way of example comprises a base rule 1, there being formed near one end of said base rule an opening in which is fitted a bushing 2. The device additionally comprises two rules 3 and 4 each provided near one end with a similar circular opening through which the bushing 2 is also inserted, as shown more especially in FIG. 2.

Said rules are maintained assembled together with the bushing by means of two small plates 5 and 6 between which are imprisoned the bushing 2 and the three rules 1, 3 and 4. The rules are preferably assembled with slight friction in order to permit of easy displacement thereof while nevertheless retaining the direction in which they have been set.

This assembly is pierced by a central opening 7 traversed by a rod 8 fitted at the top end with a plate 9 on which is mounted a mirror 10. The function of this mirror will be explained later.

The rule 1 is provided with a rear sight 11 at the end nearest the bushing 2 and also with a front sight or sighting stud 12 which is fixed at the opposite end; the rear sight 11 and stud 12 determine a line of sight which is materialized by the line 13.

Similarly, the rule 3 is provided with a stud 14 which determines the center of the mirror a line of sight 15 and the rule 4 is provided with a stud 16 which determines a line of sight 17. The lines of sight 15 and 17 can also be materialized by lines cut on the top face of the corresponding rule.

The base rule 1 is provided with two longitudinal openings 18 and 19 which are parallel to the longitudinal edges of said rule and formed in the vicinity of these latter. Similarly, the rules 3 and 4 are provided respectively with elongated openings 20 and 21 which are subtantially parallel to and in the vicinity of the edges 22 and 23 of these opposite-facing rules.

A bolt 24 passes simultaneously through the openings 18 and 20 and a knurled nut 25 screw onto said bolt so as to make it possible in known manner to clamp the rules 1 and 3 in position with respect to each other. Similarly, the bolt 26 which passes through the openings 19 and 21 and on which the knurled nut 27 is screwed serves to clamp the rules 1 and 4 in position with respect to each other.

When it is desired to make use of this device for establishing the position of a ship which is within sight of the shore, the line of sight 13 of the rule 1 is directed towards a single landmark such as a lighthouse 28, for example. There is then selected a second landmark 29 such as a church steeple and the mirror 10 is then rotated until the image of the lighthouse 28 as seen in direct vision is superimposed on the image of the church steeple as seen in reflected vision. Then, without touching the mirror, the rule 3 is swung round so that the stud 14 seen by reflection in said mirror is superimposed on the stud 12 which is seen in direct vision. The line of sight 15 will then be directed towards the church steeple 29 and the lines 13 and 15 will materialize the angle at which the lighthouse 28 and the church steeple 29 can be seen from the ship.

The same procedure is repeated in the case of a third coastal landmark, namely the beacon 30 and, finally, the rules 3 and 4 are clamped in position in the manner which has been explained above.

It is merely necessary to apply said device to the map or chart after having removed the mirror and to take steps to ensure that, by means of slight displacements of all three rules, the lines of sight 13–15–17 pass respectively through the single landmarks 28, 29 and 30. Accordingly, the position of the boat is obviously shown by the position of the mounting-pin 8 of the mirror, with the result that, if the position of the opening through which the pin 8 passes is marked with a pencil dot, the position of the ship on the chart is automatically obtained.

This result can be explained very simply:

The alignment operations which are carried out by means of the two movable rules and the base rule make it possible as a result to determine the arc which contains the angle 28, 7, 29 and the angle 28, 7, 30. These two arcs have a common center at 7. The transfer of said device onto the chart also consists in plotting on this latter the two subtending arcs referred-to and consequently in fixing the position of the center of said two arcs, that is to say the point representing the position of the ship.

By means of the device which has just been described, the position of a ship which has been sighted from the shore can thus be determined within an extremely short time. In principle, this position is obtained with a degree of accuracy of the order of ½ to 1 degree, such a degree of accuracy being wholly sufficient in practice.

As will be readily understood, the mode of execution of the invention which has just been described is only one non-limitative example and any or all detail modifications can be made therein without consequently departing from the scope or the spirit of the invention.

What I claim is:

1. A device for determining the position of a ship, comprising:
   a base rule having a rear sight adjacent one end thereof and a sighting stud adjacent the other end thereof so as to define a line of sight therebetween, said base rule being of transparent material and having said line of sight formed thereon;
   pivot means connected to said base rule adjacent one end thereof, said pivot means defining a pivot axis which is transverse to and intersects the line of sight formed on said base rule, said pivot means further having a circular opening therein with the longitudinal axis of said opening being axially aligned with said pivot axis;
   a first sighting rule mounted adjacent one end thereof on said pivot means for pivotable movement relative to said base rule, said first sighting rule being of transparent material and having a sighting stud provided thereon adjacent the free end thereof, said sighting stud and said pivot axis cooperating to define a line of sight with said line of sight being formed on said first sighting rule;
   a second sighting rule mounted adjacent one end thereof on said pivot means for pivotable movement relative to said base rule and relative to said first sighting rule, said second rule being of transparent material and having a sighting stud provided thereon adjacent the free end thereof, said sighting stud and said pivot axis cooperating to define a sighting line with said sighting line being formed on said second sighting rule;
   mirror means mounted on said pivot means for pivotal movement relative to each of said rules, said mirror means including a pin rotatably mounted within said circular opening and a mirror mounted on one end of said pin, said mirror means being removable from said device by slideably removing said pin from said opening;
   first clamping means for immovably securing said first sighting rule in a selected position relative to said base rule, said base rule having a first elongated slot extending along one longitudinal edge thereof and said first sighting rule having a second elongated slot therein, a threaded bolt extending through said first and second elongated slots and a knurled nut in threaded engagement with said bolt, said first sighting rule being immovably fixed with respect to said base rule when said knurled nut is rotated into tight gripping engagement with said rules, loosening of said knurled nut permitting said bolt to be slideably moved longitudinally of said slots for permitting adjustment in the angularity between said first sighting rule and said base rule; and
   second clamping means for immovably securing said second sighting rule in a selected position relative to said base rule, said base rule being provided with a third elongated slot therein adjacent the other longitudinal edge with said third slot being substantially parrallel to said first slot, said second sighting rule having a fourth longitudinal slot therein and a threaded bolt extending through said third and fourth slots and having a knurled nut in threaded engagement therewith for fixedly securing said second sighting rule relative to said base rule when said knurled nut is rotated into tight gripping engagement with said rules, loosening of said knurled nut permitting said bolt to be slideably moved longitudinally of said slots for adjusting the angularity of said second sighting rule relative to said base rule.

2. A device as defined in claim 1, wherein:
   said pivot means includes a cylindrical bushing with said base rule and said first and second sighting rules being rotatably mounted on the periphery of said bushing; and
   flange means secured to the opposite axial ends of said bushing with said flange means extending radially outwardly beyond the periphery of said bushing for maintaining said rules on said bushing, said flange means causing said rules to be frictionally held in a selected position while permitting free manual angular displacement thereof.

References Cited

UNITED STATES PATENTS

| 1,633,854 | 6/1927 | Frantz | 33—88 |
| 2,328,517 | 8/1943 | von Opel | 33—67 |
| 2,419,597 | 4/1947 | Rushmore | 33—65 |
| 2,531,248 | 11/1950 | Belch | 88—2.4 X |
| 2,697,234 | 12/1954 | Sturdevant | 33—64 X |

FOREIGN PATENTS

| 779,494 | 1/1935 | France. |
| 166,589 | 7/1921 | Great Britain. |

ROBERT B. HULL, *Primary Examiner.*